United States Patent [19]

Fukuda et al.

[11] Patent Number: 4,959,729
[45] Date of Patent: Sep. 25, 1990

[54] VIDEO CAMERA HAVING ROTATABLE VIEWFINDER

[75] Inventors: Hiroshi Fukuda; Hideo Miura; Masahiko Mizuno, all of Tokyo, Japan

[73] Assignee: Fuji Photo Film Co., Ltd., Kanagawa, Japan

[21] Appl. No.: 275,889

[22] Filed: Nov. 25, 1988

[30] Foreign Application Priority Data

Nov. 25, 1987 [JP] Japan .................. 62-179461[U]

[51] Int. Cl.$^5$ .................. H04N 5/76; H04N 5/225
[52] U.S. Cl. .................. 358/229; 358/224; 358/335
[58] Field of Search ........... 358/224, 229, 209, 217, 358/225, 41, 335; 360/33.1, 137, 906, 909

[56] References Cited

U.S. PATENT DOCUMENTS

| | | | |
|---|---|---|---|
| 4,389,675 | 6/1983 | Suzuki et al. | 358/224 |
| 4,494,147 | 1/1985 | Komine | 358/224 |
| 4,550,343 | 10/1985 | Nakatani | 358/229 |
| 4,591,254 | 5/1986 | Sokolowski | 358/224 |
| 4,623,931 | 11/1986 | Inaga et al. | 358/229 |
| 4,705,374 | 11/1987 | Robings | 358/224 |
| 4,772,902 | 8/1988 | Inoue et al. | 358/229 |

*Primary Examiner*—Donald McElheny, Jr.
*Attorney, Agent, or Firm*—Sughrue, Mion, Zinn, MacPeak & Seas

[57] ABSTRACT

A portable video camera of the type having a taking lens and an electronic video imaging device comprises a camera body incorporating the electronic video imaging device therein, a handgrip turnably mounted on one side wall of the camera body, and a view finder, electronic or optical, structurally integral with the handgrip for viewing an image of a subject therethrough. Being changeable in position according to camera angles, the action finder can be brought into alignment with an eye of the operator in any shooting angle.

24 Claims, 7 Drawing Sheets

VIDEO CAMERA HAVING ROTATABLE VIEWFINDER

BACKGROUND OF THE INVENTION

The present invention relates to a video camera, and more particularly to a portable video camera with a handgrip having a built-in action finder.

There are well known in the art various portable video cameras having a handgrip attached to the bottom of the camera body and a view finder mounted on the top of the camera body which is adjustable in angular position.

The recent tendency in portable video cameras is to provide a grip changeable in angle relative the camera body for easy handling. A problem in association with such a portable video camera is a difficulty of sighting a subject through a view finder of the portable video camera at a low angle camera position. This is due to the view finder being built in or mounted on the camera body. There are some large video cameras provided with adjustable view finders. Even with the provision of such an adjustable view finder, it is still difficult to handle the large video camera when using it at low angle camera positions because a grip of the large video camera is generally structurally integral with the camera body thereof.

In some instances, with video cameras of this type, it is troublesome to change the camera angle or position between a high angle and low angle camera position because it is necessary to bend the wrist or hand of an operator backward when shifting the camera in particular from a high angle camera position to a low angle camera position. Additionally, in some of the video cameras of this type two actions are necessary: adjusting the view finder, and thereafter the grip, in angular position. This brings the video camera to a standstill.

SUMMARY OF THE INVENTION

It is, therefore, an object of the present invention to provide a portable video camera which is easily handled at any camera position.

It is another object of the present invention to provide a portable video camera in which it is easy to sight a subject through an action finder at any camera position.

It is still another object of the present invention to provide a portable video camera which is smoothly shiftable between a high angle and a low angle camera position even with a single action and without bringing the video camera to a standstill.

The portable video camera according to the present invention is provided with a view finder which is structurally integral with a handgrip turnable relative to the camera body. The view finder, preferably an action finder, is oriented in cooperation with the handgrip. The handgrip is rotatable to easily hold the video camera according to various camera positions, so that the action finder can be brought into alignment with an eye of the operator at any shooting camera position. This results not only in the shifting of the video camera in a single action while continuing the video photography, but also to an easy observation of a subject through the action finder.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

Figure 1:
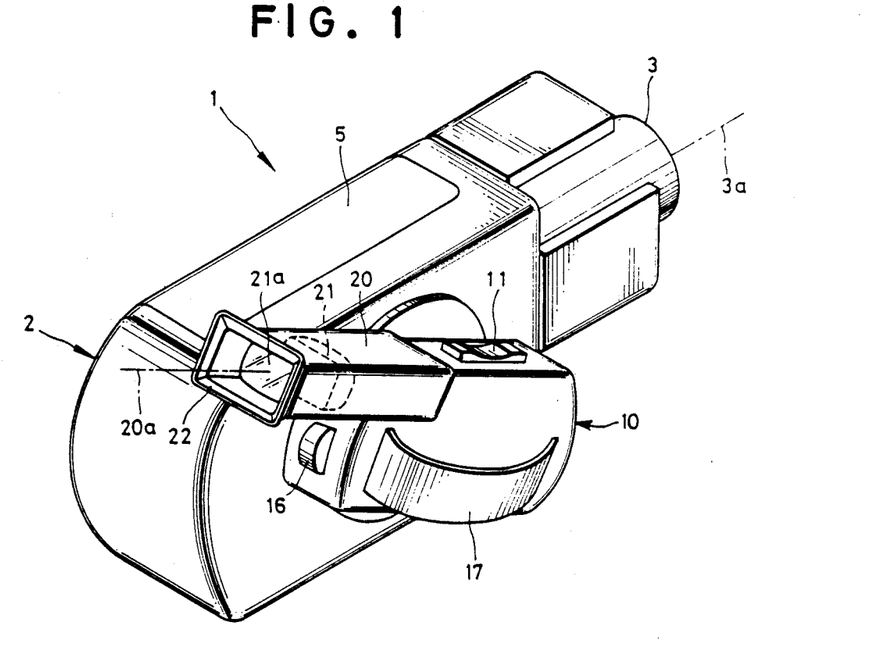
FIG. 1 is a perspective view of a portable video camera according to a preferred embodiment of the present invention in which a handgrip is rotated up.

Referring now to FIG. 1, there is shown a portable video camera 1 according to a preferred embodiment of the present invention. As shown, the portable video camera 1 is provided with a zoom lens 3 having the optical axis 3a thereof as a taking lens and a turnable handgrip assembly 10 mounted on one side wall of the camera body 2. The zoom lens 3 is automatically focused by an automatic focusing device which is well known in the art and therefore need not be explained in detail herein, and is changeable in focal length by means of a zooming button 11 in the form of an externally operable double-throw button. In the camera body 2, an image pick-up unit 25 comprising an image sensing device and an image recording device is disposed (see FIG. 3), which image sensing device and image recording device are well known to those skilled in the art. The image sensing device, on which an image of a subject is formed by the zoom lens 3, outputs video signals which in turn are recorded in a magnetic recording medium by means of a magnetic recording head in the image recording device after having been properly processed.

Figure 2:
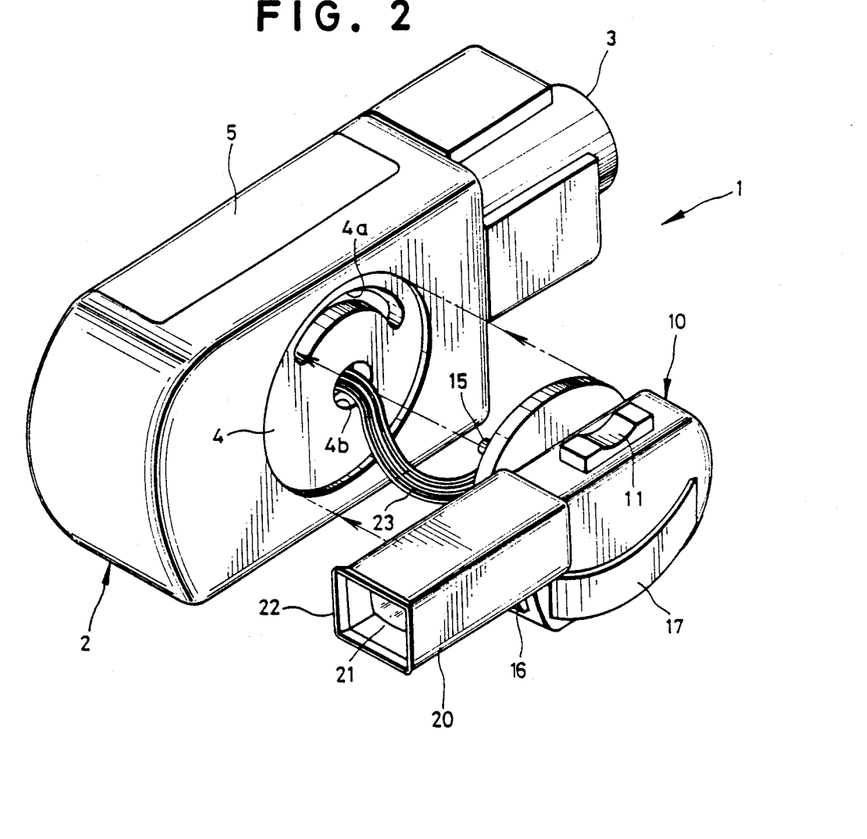
FIG. 2 is a perspective exploded view of the portable video camera of FIG. 1 in which the handgrip is demounted.
Figure 3:
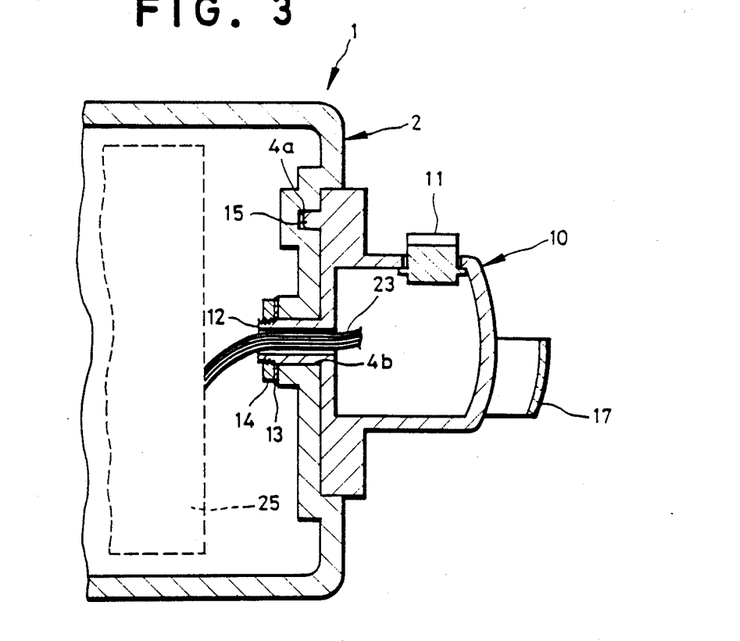
FIG. 3 is a cross sectional view of an essential part of the portable video camera of FIG. 1.

In the side wall there is formed a circular recess 4 with a circular arcuate groove 4a and a center hole 4b as is best seen in FIGS. 2 and 3. The handgrip assembly 10 is integrally formed with a connecting shaft 12 having threads at its end and which is received in the center hole 4b and is held with a nut 14 through a spring washer 13. Owing to the provision of the spring washer 13, the handgrip assembly 10 supported by the camera body 2 can be turned with a certain friction relative to the camera body 2 and held at a desired angular position relative to the camera body 2. The arcuate groove 4a, which is engaged by a pin 15 formed on the inside wall of the handgrip assembly 10, defines the extremities of rotation of the handgrip assembly 10. It is preferred to provide the center hole 4b at the center of gravity of the camera for balancing the video camera on the handgrip assembly 10 held by a hand.

The handgrip assembly 10 is further provided with an action finder having a view axis 20a integrally connected thereto and an externally operable video recording button 16. The action finder 20 is of the electronic type including a small size CRT monitor 21 which displays an image taken by the zoom lens 3 thereon. The image on the CRT monitor 21 is viewed through an eye piece 21a. The externally operable buttons 11 and 16 and the CRT monitor 21 are connected to their associated electrical elements in the camera body 2 by means of flexible wires 23 passing through a bore formed in the connecting shaft 12. Denoted by numerals 16, 17 and 22 are a video camera start/stop button, a hand strap and an eye cup, respectively.

Figure 4A:
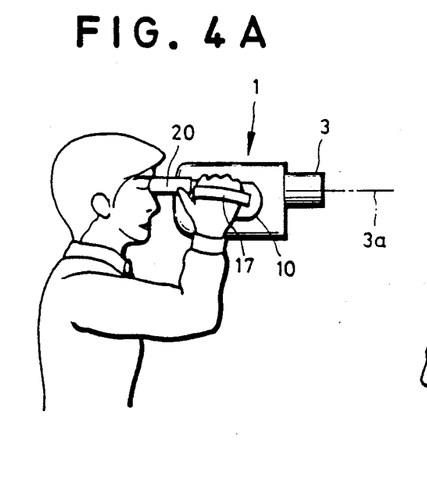
FIG. 4(A) is an illustration showing that the portable video camera is used at an eye level camera position.

When using the portable Video camera 1, a top door 5 of the camera body 1 is opened and a video tape cassette is loaded in the portable video camera 1. The handgrip assembly 10 is grasped by the right hand of the operator passed through the strap 17 to hold the portable video camera. By thus grasping the handgrip assembly 1, the zooming button 11 and the video camera start/stop button 16 can be operated with fingers of the hand by which the handgrip is held while viewing and framing a subject on the CRT monitor 21 as is shown in FIG. 4(A) illustrating the portable video camera held at an eye level or a high angle camera position. In this way, it is possible to shift the camera position even from a high angle to a low angle camera position, or from a low angle to a high angle camera position, while continuously shooting scenes.

Figure 4B:
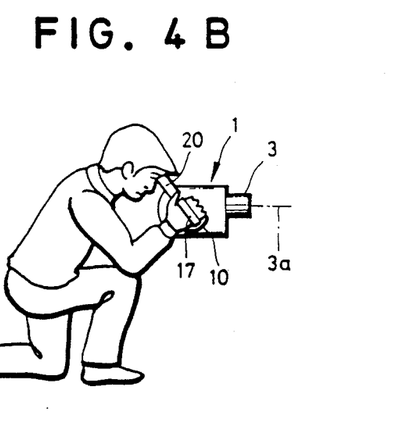
FIG. 4(B) is an illustration showing that the portable video camera is used at a low angle camera position.

As illustrated in FIG. 4(B). the portable video camera I can be held at a low angle camera position by grasping the handgrip assembly 10 turned through an appropriate angle. The handgrip assembly 10 so turn orients the action finder 20 to the eye of the operator in a stooping position. This allows the operator to view the action finder 20 at a relatively high position by holding the portable video camera 1 firmly and to thereby assume a comfortable posture for shooting scenes.

As apparent from the above description, since the action finder 20 is integrally connected to the handgrip assembly 10 turnable according to various camera positions, the monitor CRT 21 of the action finder 20 can be brought into alignment with an eye of the operator in any shooting angle, resulting in an easy observation of the monitor CRT 21 of the action finder 20. The integral connection of the action finder 20 to the handgrip assembly 10 avoids the provision of a mechanism for moving the action finder 20 according to eye positions or camera angles or positions rather than the mechanism allowing the turning of the handgrip assembly 10.

The action finder 20, in particular the monitor CRT 21, can be directed downward by extending the groove 4a so that it is possible to shift the camera position and accordingly the portable video camera can be used at a high angle camera position.

Figure 5:
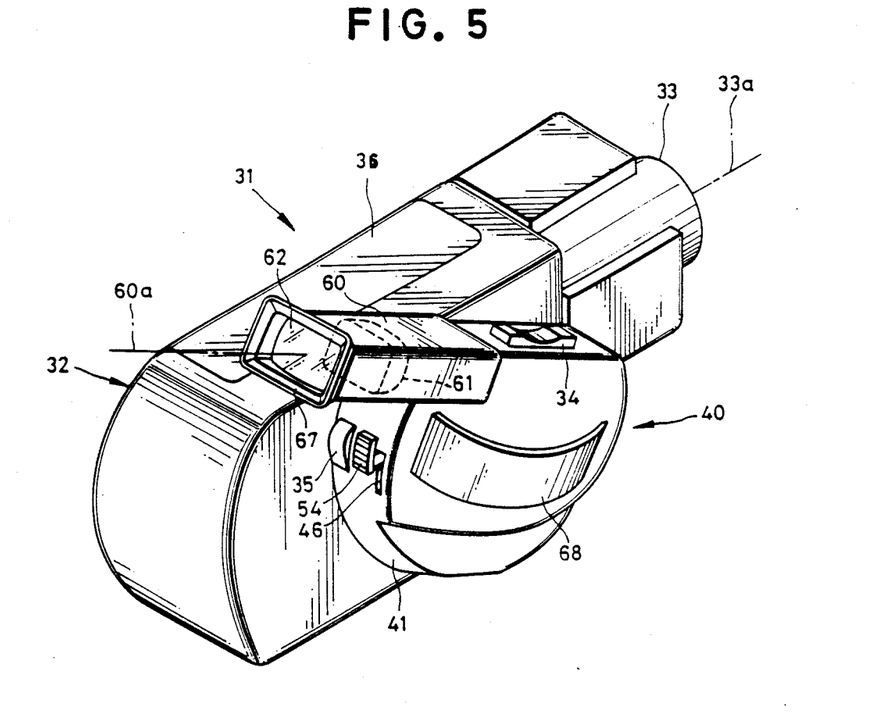
FIG. 5 is a perspective view of a portable video camera according to another preferred embodiment of the present invention.
Figure 6:
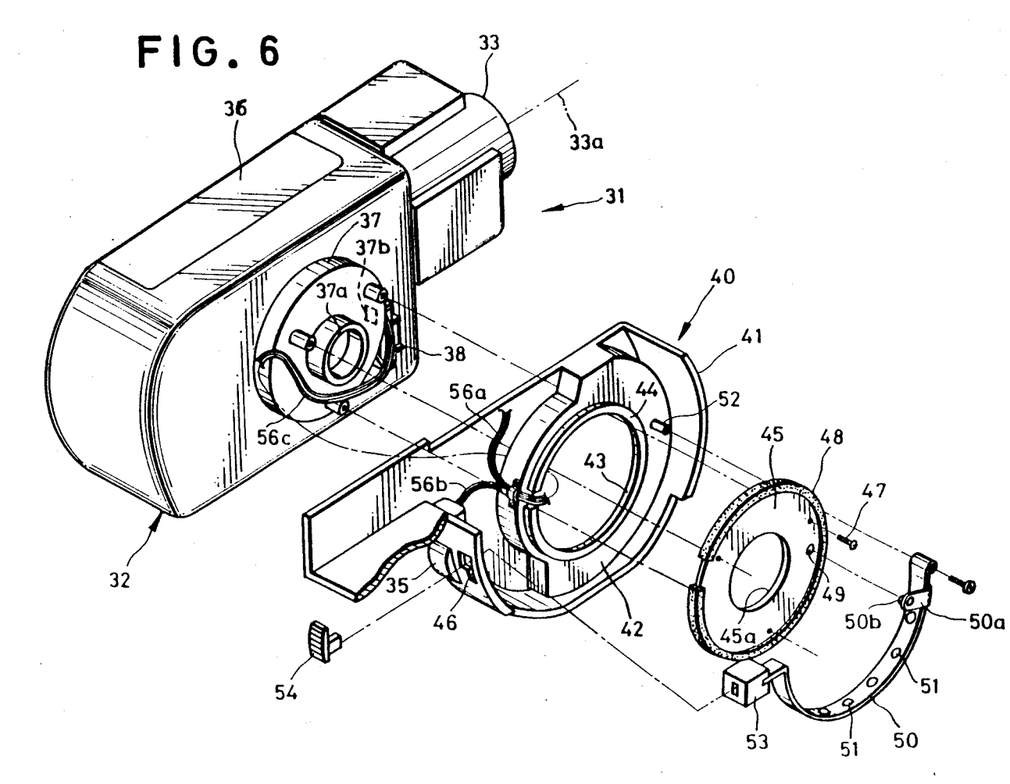
FIG. 6 is an exploded perspective view of the portable video camera of FIG. 5.
Figure 7:
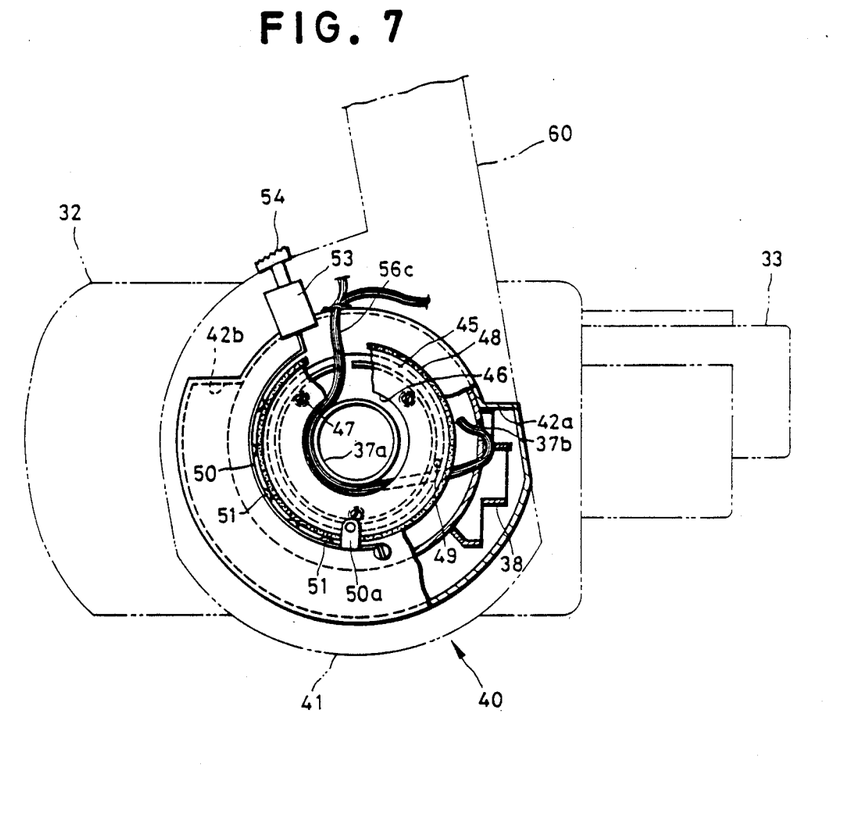
FIG. 7 is an explanatory plane view showing of an essential part of a handgrip mounting mechanism of the video camera of FIG. 5.

Referring now to FIGS. 5 to 7, there is shown a portable video camera 31 according to another preferred embodiment of the present invention. As shown, the portable video camera 31 which is basically similar to that of FIG. 1, is provided with a zoom lens 33 having the optical axis 33a thereof as a taking lens and a turnable handgrip assembly 40 mounted on one side wall of the camera body 32. The zoom lens 33 is automatically focused by an automatic focusing device which is well known in the art and therefore need not be explained in detail herein, and which is changeable in focal length by operating a zooming button 34 which is in the form of an externally operable double-throw button and is provided on the top wall of the handgrip assembly 40. Internal mechanisms of the video camera 31 are substantially the same as those of the video camera of FIG. 1 and need not be explained again. The handgrip assembly 40 is further provided with an action finder 60 having a view axis 60a integrally connected thereto and an externally operable video camera start/stop button 35. The action finder 60 is of an electronic type having a small size CRT monitor 61 which displays an image taken by the zoom lens 33 thereon and an eye piece 62 through which a virtual image of the CRT monitor screen can be viewed at an eye point up to approximately 50 cm. Denoted by numerals 67 and 68 in FIG. 5 are an eye cup and a hand strap, respectively.

The handgrip assembly 40 is, as shown in detail in FIG. 6, rotatably mounted on a mount 37 with an annular rim 37a provided on the side wall of the camera body 32. A housing 41 of the handgrip assembly 40 is integrally formed with a mount cap 42 having an opening 43 defined by an annular rim 44. The mount 37 is received in the opening 44 of the housing 41 so as to support the handgrip assembly 40 thereon. In order to prevent the housing 41 from slipping out from the mount 37, the mount 37 is attached with a supporting disk 45 having a center opening 46 with a set of set screws 47 in such a way as to allow the housing 41 to rotate relative to the camera body 32. The supporting disk 45 is provided with a ring 48 such as a rubber ring.

A half-round of spring band 50 is pivotally mounted on a boss 52 extending from the mount cap 42 so as to surround a half of the periphery of the rubber ring 48. The spring band 50 is formed with a plurality of projections 51 on the inner surface thereof and is provided with a block 53 fixed to its free end. Connected to the block 53 is a externally operable knob 54 passing through a generally reversed L-shaped slot 46 comprising arm and stem sections formed in the housing 45. When a connecting piece of the knob 54 is in the arm section of the slot 46, the spring band 50 is firmly pressed against the outer surface of the rubber ring 48 so as to lock the handgrip assembly 40 at any desired turned position relative to the camera body 32. However, when the connecting piece of the knob 54 is in the stem section of the slot 46, the spring band 50 is loosened to allow the handgrip assembly 40 to turn to any possible position relative to the camera body 32. The spring band 50 is further provided with a click stop mechanism comprising a resilient lug 50a having a locking member 50b in the form of a hemisphere. This lock member 50b is engageable with a locking recess 49 shaped in the form of a hemisphere in the supporting disk 45 so as to lock the handgrip assembly 40 at a position to hold the optical axis 60a of the action finder 60 parallel to the optical axis 33a of the zoom lens 33.

As shown in FIG. 7, on the side wall of the video camera body 32 there is provided a stopper member 38 which is engageable with stepped portions 42a and 42b of the mount cap 42 to limit upward and downward turn of the handgrip assembly 40. It is desirable to dimension the stopper member 38 and the stepped portions 42a and 42b so as to allow the handgrip assembly 40 to turn approximately 80 degrees upwardly and approximately 45 degrees downwardly. It is desirable to form the stopper member 38 as a part of a chassis to which various circuits are attached, the part projecting out of the video camera body 32.

The zooming button 34 and the video camera start/stop button 35 are connected to circuitry (not shown) inside the video camera body 32 through wire-bundles 56a and 56b, respectively. The wire-bundles 56a and 56b are tied up into a single wire-bundle 56c outside the mount cap 42 and pass through the opening 43 of the mount. The single wire-bundle 56c is trained around half the rim 37a of the mount 37 and enters inside the video camera body 32 through an opening 37b formed in the mount 37.

When using the portable video camera 31, a top door 36 of the camera body 32 is opened and a video tape cassette is loaded in the portable video camera 31. The handgrip assembly 40 is grasped by the right hand of the operator passed through the strap 68 to hold the portable video camera 31. By thus grasping the handgrip assembly 40, the zooming button 34 and the video camera start/stop button 35 can be operated with fingers of the right hand while viewing and framing an image of a subject displayed on the CRT monitor 61 through the eye piece 62. When it is desired to hold the portable video camera and to shoot a subject at an eye level camera position, the locking knob 54 is shifted aside toward the right as viewed in FIG. 5 so as to loosen the spring band 50a in order to allow the handgrip assembly 40 to turn. By turning the handgrip assembly 40 in the clockwise direction as viewed in FIG. 5, the hemispherical ball tip member 50b is received in the recess 49 to stop the handgrip assembly 40 and hold it parallel to the optical axis 33a of the zoom lens 33. The video camera 31 is thereby held at an eye level camera position. For maintaining the handgrip assembly 40 at the position, the locking knob 54 is brought into engagement with the arm section of the L-shaped slot 46 of the housing 41 so as to tighten the spring band 50 against the rubber ring 48 of the supporting disk 45.

When turning the handgrip assembly 40 upward or downward, the locking knob 54 is disengaged from the arm section of the slot 46 and allowed to enter into the stem section of the slot 46 to loosen the spring band 50, allowing the handgrip assembly 40 to be turnable. The handgrip assembly 40 can be turned up or down to be tilted at any desired angle. By re-engaging the locking knob 54 with the arm section of the slot 46, the spring band 50 is tightened against the rubber ring 48 of the supporting disk 45 so as to hold the handgrip assembly 40 at a desired turned position, thereby allowing the video camera to be held at a high or low angle camera position.

As apparent from the above description, since the action finder 60 is integrally connected to the handgrip assembly 40 turnable according to various camera positions, the monitor CRT 61 of the action finder 60 can be brought into alignment with an eye of the operator in any shooting angle, resulting in an easy observation of the monitor CRT 61 of the action finder 40. The integral connection of the action finder 60 to the handgrip assembly 40 avoids the provision of a mechanism for moving the action finder 60 independently from the handgrip assembly 40 according to eye positions or camera angles rather than the mechanism for allowing the turning of the handgrip assembly 10.

Figure 8:
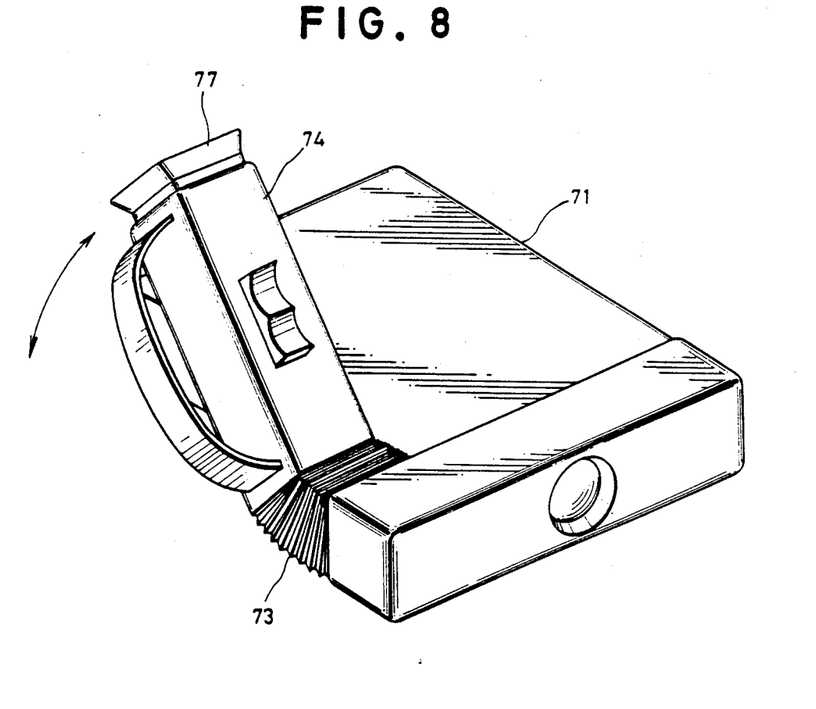
FIG. 8 is a perspective view of a portable video camera according to still another preferred embodiment of the present invention.

Referring now to FIG. 8 showing a portable video camera according to another preferred embodiment of the present invention, the camera body 71 of the portable video camera is provided with a handgrip assembly 74 mounted on a side wall thereof. An electronic action finder 77 including a monitor CRT is incorporated in the handgrip assembly 74. Electrical elements of the action finder and operating members such as a zooming button, a video recording button and so on are connected to their associated electrical elements inside the camera body 72 by means of flexible wires 83 passing through a bellows 73 connecting the camera body 71 and the handgrip assembly 34.

It is to be noted that the present invention can be applied to video cameras of the type having optical finders.

The present invention has been shown and described with reference to specific embodiments. However, it should be noted that the invention is in no way limited to the details of the illustrated embodiments, and changes and modifications may be made without departing from the scope of the appended claims.

What is claimed is:

1. A portable video camera comprising:
   a camera body having a lens and a device for producing a video image;
   a handgrip to be grasped by a hand to hold said video camera body said handgrip being rotatably mounted on one side wall of said camera body; and
   a view finder, structurally integral with said handgrip so as to be rotatable for viewing an object, wherein said view finder comprises means for rotatably positioning and releasably engaging said view finder in any of a plurality of positions so as to facilitate viewing through said view finder in said plurality of positions.

2. A portable video camera as defined in claim 1, wherein said handgrip and said view finder are changeable in angular position relative to said camera body as one integral body.

3. A portable video camera as defined in claim 1, wherein said view finder is electronic.

4. A portable video camera as defined in claim 1, wherein said view finder is connected to said handgrip.

5. A portable video camera as defined in claim 1, wherein said view finder is incorporated in said handgrip.

6. A portable video camera as defined in claim 1, further comprising an arcuate groove and an engaging pin for restricting rotatable movement of said handgrip.

7. A portable video camera as defined in claim 1, further comprising a bellows-shaped member positioned between said handgrip and said camera body.

8. A portable video camera as defined in any one of said claims 1 through 5, wherein said handgrip comprises a hand strap.

9. A portable video camera as defined in any one of said claims 1 through 5, wherein said handgrip comprises at least one of a zooming button and a video recording button.

10. A portable video camera as defined in any one of said claims 1 to 5, wherein said view finder is an action finder including a CRT display and an eye piece through which an image on said CRT display is viewed.

11. A portable video camera comprising:
    a camera body having a lens and a device for producing a video image;
    a handgrip to be grasped by a hand to hold said camera body, said handgrip being rotatably mounted on one side wall of said camera body;
    a camera position changing mechanism operationally interconnecting said camera body and said handgrip for allowing said handgrip to be rotated through a desired angle relative to said camera body so as to engage said handgrip relative to said camera body in any of a plurality of positions, thereby changing a camera position of said video camera to any of said plurality of positions between a high and a low angle camera position; and an electronic view finder, structurally integral with said handgrip, for viewing an image of an object such that said view finder also is engageable in any of said plurality of positions.

12. A portable video camera as defined in claim 11, wherein said camera position changing mechanism has detaining means for releasably detaining said handgrip in a desired turned position.

13. A portable video camera as defined in claim 12, wherein said detaining means comprise a supporting member by which said handgrip is supported for turning upward and downward, and a tightening member, pivotally mounted on said handgrip, for contacting said supporting member elastically for engagement in any of said plurality of positions.

14. A portable video camera as defined in claim 13, wherein said supporting member is shaped in the form of a disk and is provided with an elastic annular ring.

15. A portable video camera as defined in claim 14, wherein said tightening member is a spring band in the form of a semi-circle to surround half an outer periphery of said elastic annular ring of said disk-shaped supporting member.

16. A portable video camera as defined in claim 15, wherein said spring band is provided with a plurality of projections.

17. A portable video camera as defined in claim 15, wherein said spring band is provided with an externally operable member which is releasably engaged in a slot formed in a housing of said handgrip to maintain said spring band in contact with said elastic annular ring of said supporting member.

18. A portable video camera as defined in claim 17, wherein said slot comprises an arm section which said externally operable member engages to maintain said spring band in contact with said elastic annular ring of said supporting member and a stem section in which said externally operable member allows said spring band to be loosened so as to allow said handgrip to turn.

19. A portable video camera as defined in claim 15, wherein said spring band is provided with a resilient lug having a hemispherical projection which is engageable with a hemispherical recess formed in said supporting member to hold said handgrip parallel to the optical axis of said lens, thereby making it possible to hold said camera body horizontally.

20. A portable video camera as defined in any one of said claims 11 to 19, wherein said view finder is an action finder including a CRT display and an eye piece through which an image on said CRT display is viewed.

21. A portable video camera comprising:

a camera body having a lens and a device for producing a video image;

a mount formed on one side wall of said camera body;

a handgrip to be grasped by a hand to hold said camera body, said handgrip being rotatably mounted on said mount for engagement in any of a plurality of positions;

a camera position changing mechanism operationally interconnecting said camera body and said handgrip for allowing sand handgrip to be turned relative to said camera body through a desired angle, thereby changing a camera position of said video camera for engagement in any of said plurality of positions between a high and a low angle camera position;

an electronic view finder, structurally integral with said handgrip for viewing an image of an object in any of said plurality of positions; and an externally operable video camera control button provided on a housing of said handgrip, said video camera control button being connected to circuitry in said camera body by means of a wire bundle.

22. A portable video camera as defined in claim 21, wherein said mount is provided with an annular rim for forming an annular space between said housing of said handgrip, said wire bundle being trained around half said annular rim.

23. A portable video camera as defined in claim 21 or 22, wherein said view finder is an action finder including a CRT display and an eye piece through which an image on said CRT display is viewed.

24. A portable video camera as defined in claim 1, wherein said means for rotatably positioning comprises frictional engaging means for frictionally engaging said handgrip and said view finder relative to said camera body for stable viewing of said plurality of positions.

* * * * *